(12) United States Patent
Taguchi

(10) Patent No.: US 7,432,018 B2
(45) Date of Patent: Oct. 7, 2008

(54) CYLINDRICAL ALKALINE STORAGE BATTERY

(75) Inventor: Koji Taguchi, Gunma (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 877 days.

(21) Appl. No.: 10/909,363

(22) Filed: Aug. 3, 2004

(65) Prior Publication Data

US 2005/0031939 A1    Feb. 10, 2005

(30) Foreign Application Priority Data

Aug. 4, 2003    (JP) .............................. 2003-286321

(51) Int. Cl.
*H01M 4/64*    (2006.01)
*H01M 4/72*    (2006.01)

(52) U.S. Cl. ....................................... 429/233; 429/241

(58) Field of Classification Search ................... 429/94, 429/164, 209–234
See application file for complete search history.

(56) References Cited

U.S. PATENT DOCUMENTS 5,683,834 A * 11/1997 Fujimoto et al. ............ 429/221
6,051,333 A    4/2000 Nagai et al.

FOREIGN PATENT DOCUMENTS

JP    4-206474    9/1992

OTHER PUBLICATIONS

Chinese Office Action dated Feb. 10, 2006, issued in corresponding Chinese patent application No. 2004 100559182.

* cited by examiner

*Primary Examiner*—Dah-Wei Yuan
*Assistant Examiner*—Steven Scully
(74) *Attorney, Agent, or Firm*—Westerman, Hattori, Daniels & Adrian, LLP.

(57) ABSTRACT

A cylindrical alkaline storage battery suitable to increase its capacity and arranged to prevent a short circuit and internal resistance increase, including an electrode group held in an outer can and formed by rolling up together a negative electrode having a negative-electrode core body and a hydrogen-absorbing alloy layer supported thereon, a positive electrode, and a separator. The negative electrode includes a main part forming inside part of the electrode group, a thin part smaller than the main part in the thickness of the hydrogen-absorbing alloy layer and the amount of a hydrogen-absorbing alloy contained in unit volume of that layer, and a boundary part formed between the main and thin parts and having a hydrogen-absorbing alloy layer thickness varying along the length of the negative-electrode core body. The positive electrode outer end and the negative electrode boundary part are at different positions circumferentially of the electrode group.

6 Claims, 4 Drawing Sheets

CYLINDRICAL ALKALINE STORAGE BATTERY

CROSS-REFERENCE TO THE RELATED ART

This nonprovisional application claims priority under 35 U.S.C. §119(a) on Patent Application No. 2003-286321 filed in Japan on Aug. 4, 2003, the entire contents of which are hereby incorporated by reference.

BACKGROUND OF THE INVENTION

1. Field of the Invention

The invention relates to a cylindrical alkaline storage battery suitable for increasing capacity thereof.

2. Description of the Related Art

As alkaline storage batteries, there can be mentioned, for example, a nickel-cadmium rechargeable battery, a nickel-hydrogen rechargeable battery, etc., which contain different active materials. Among these alkaline storage batteries, there are cylindrical ones having a cylindrical outer can that accommodates therein an electrode group formed by strip-shaped negative and positive electrodes that are spirally wound, with a separator interposed therebetween.

In this type of cylindrical alkaline storage battery, the negative electrode is made larger in capacity than the positive electrode so as to reduce oxygen gas produced in overcharging, thereby preventing the inner pressure from increasing. In order to increase the battery capacity, it is required to increase the amount of a positive-electrode active material. To meet this requirement, various proposals have been made.

For example, a cylindrical alkaline storage battery is disclosed in Japanese Unexamined Patent Publication No. Hei 4-206474, in which that part of the negative electrode which forms the outermost circumference of the electrode group and which contributes little to battery reaction is made smaller in thickness than the other part. It is thought that the battery disclosed in Japanese Unexamined Patent Publication No. Hei 4-206474 is arranged to decrease the thickness of part of the negative electrode forming the outermost circumference of the electrode group, thus increasing the volumetric efficiency to achieve high capacity However, the cylindrical alkaline storage battery disclosed in Japanese Unexamined Patent Publication No. Hei 4-206474 can produce cracks and/or splits in the thin part of the negative electrode which forms the outermost circumference of the electrode group. This poses a problem of part having a crack and/or a split piercing through the separator and coming in contact with the positive electrode to produce a short circuit, and another problem of the electrical resistance being increased in the aforementioned part to increase the internal resistance of the storage battery, allowing the storage battery to abnormally heat during charging and discharging.

SUMMARY OF THE INVENTION

An object of the invention is to provide a cylindrical alkaline storage battery suitable for increasing capacity thereof and arranged to prevent a short circuit and increase in internal resistance.

A cylindrical alkaline storage battery according to the invention comprises an electrically-conductive cylindrical outer can and an electrode group accommodated in the outer can together with an alkaline electrolyte. The electrode group is formed by rolling up together a positive electrode, a negative electrode placed outside the positive electrode and including a strip-shaped negative-electrode core body and an active material layer supported by the negative-electrode core body, and a separator inserted between the positive electrode and the negative electrode. An outermost circumferential part of the electrode group is formed of the negative electrode and in contact with a circumferential wall of the outer can. The negative electrode extends beyond an outer end of the positive electrode in the circumferential direction of the electrode group. The negative electrode comprises a main part forming an inside part of the electrode group, a thin part forming the outermost circumferential part of the electrode group which is smaller in the thickness of the active material layer and smaller in the amount of an active material contained in unit volume of the active material layer than the main part, and a boundary part formed between the main part and the thin part in which the thickness of the active material layer changes in a lengthwise direction of the negative-electrode core body. The outer end of the positive electrode and the boundary part of the negative electrode are positioned at different positions in the circumferential direction of the electrode group.

Since the negative electrode has the thin part, the cylindrical alkaline storage battery according to the invention is suitable for increasing the battery capacity. Since the boundary part of the negative electrode and the outer end of the positive electrode are positioned at different positions in the circumferential direction of the electrode group, a reduction is achieved in the degree to which the thin part is bent at the positive electrode outer end when the electrode group is inserted into the outer can. Since the amount of the active material contained in unit volume of the active material layer is smaller in the thin part than in the main part, the thin part is made more flexible than the main part and is bent without producing cracks and/or splits when the electrode group is inserted. Hence, this cylindrical alkaline storage battery can prevent increase in internal resistance due to cracks and/or splits in the thin part, and can also prevent heating during charging and discharging due to the increase in internal resistance. Further, a short circuit can be prevented that is produced by a part having a crack and/or a split piercing through the separator and coming in contact with the positive electrode.

The cylindrical alkaline storage battery according to the invention which is suitable for increasing the battery capacity and arranged to prevent a short circuit and increase in internal resistance is suitable as a power supply for transportation machines, machine tools, communication devices, electric/electronic apparatuses, toys, etc., and the industrial value thereof is great.

In the invention, the amount of the active material contained in unit area of the active material layer in the thin part of the negative electrode is desirably in the range of 40% to 75% of the amount of the active material contained in unit area of the active material layer in the main part of the negative electrode.

In this desirable mode, the upper limit of the amount of the active material contained in unit area of the thin part is made less than 75% of the amount of the active material contained in unit area of the main part, thereby decreasing the thickness of the thin part, and the lower limit thereof is made greater than 40% of the amount of the active material contained in unit area of the main part, whereby the thin part is ensured to include an amount of the active material large enough to contribute to battery reaction with the positive electrode and reaction for reducing oxygen gas flowing to between the electrode group and the circumferential wall of the outer can.

Hence, this cylindrical alkaline storage battery is suitable for increasing the capacity thereof, and can prevent deterioration in its cycle characteristic.

Desirably, the negative-electrode core body of the negative electrode is made of punching metal, and the active material layer of the negative electrode is supported on both sides (or outer and inner sides) of the negative-electrode core body. In the thin part of the negative electrode, the active material layer supported on the inner side of the negative-electrode core body is thicker than the active material layer supported on the outer side of the negative-electrode core body.

In this desirable mode, the active material layer supported on the inner side of the negative-electrode core body, which faces the positive electrode through the separator and contributes to both the battery reaction with the positive electrode and the reaction reducing the oxygen gas, is made thicker than the active material layer supported on the outer side of the negative-electrode core body, which comes in contact with the outer can for the electrode group and contributes solely to the reaction reducing the oxygen gas flowing to between the electrode group and the outer can, whereby both high capacity and a good cycle characteristic of the storage battery can be achieved efficiently.

Desirably, the length of the thin part of the negative electrode is in the range of 2.5 to 3.8 times the inside diameter of the outer can.

In the cylindrical alkaline storage battery configured to position the outer end of the positive electrode and the boundary part of the negative electrode at different positions in the circumferential direction of the electrode group, when the boundary part of the negative electrode is located considerably way before the outer end of the positive electrode in the circumferential direction of the electrode group, the length over which the positive electrode extends on both sides of the thin part is fairly large, so that there is a risk that the amount of the active material contributing to the battery reaction with the positive electrode is too small. On the other hand, when the boundary part of the negative electrode is located considerably way beyond the outer end of the positive electrode in the circumferential direction of the electrode group, the length over which the positive electrode does not extend outside the main part of the negative electrode is fairly large, resulting in a risk that the amount of the active material contributing to the battery reaction with the positive electrode is too large. In the desirable mode, it is arranged that the length of the thin part is in the range of 2.5 to 3.8 times the inside diameter of the outer can, whereby the boundary part can be located in an appropriate circumferential position, while satisfying the requirement essential to the invention that the negative electrode (thin part) should extend beyond the outer end of the positive electrode in the circumferential direction of the electrode group. As a result, the length over which the positive electrode extends on both sides of the thin part and the length over which the positive electrode does not extend outside the main part can be made short to reduce the risk of the amount of the active material being too small or too large. Thus, both high capacity and a good cycle characteristic can be achieved more reliably in the storage battery.

Desirably, an angle of inclination of the active material layer in the boundary part of the negative electrode is greater than 0 degree and less than 10 degrees.

In this desirable mode, concentration of stress in the boundary part at the time of the electrode group being rolled up is prevented by arranging that the angle θ of inclination of the active material layer in the boundary part is in the range of $0°<\theta<10°$ to make the change in thickness gentle, whereby shortage of strength of the boundary part is obviated and production of cracks and/or splits in the boundary part is prevented. Hence, this cylindrical alkaline storage battery can prevent increase in internal resistance due to cracks and/or splits in the boundary part, heating during charging and discharging due to the increase in internal resistance, and a short circuit produced by a part having a crack and/or a split piercing through the separator and coming in contact with the positive electrode.

Desirably, the mass per unit area of the negative-electrode core body is larger in the boundary part of the negative electrode than in the main part of the negative electrode.

In this desirable mode, the negative-electrode core is strengthened in the boundary part to prevent cracks and/or splits from being produced in the boundary part when the electrode group is rolled up, by making the mass per unit area of the negative-electrode core body larger in the boundary part than in the main part and the thin part. Hence, this cylindrical alkaline storage battery can more reliably prevent increase in internal resistance due to cracks and/or splits in the boundary part, heating during charging and discharging due to the increase in internal resistance, and a short circuit produced by a part having a crack and/or a split piercing through the separator and coming in contact with the positive electrode.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

Figure 1:
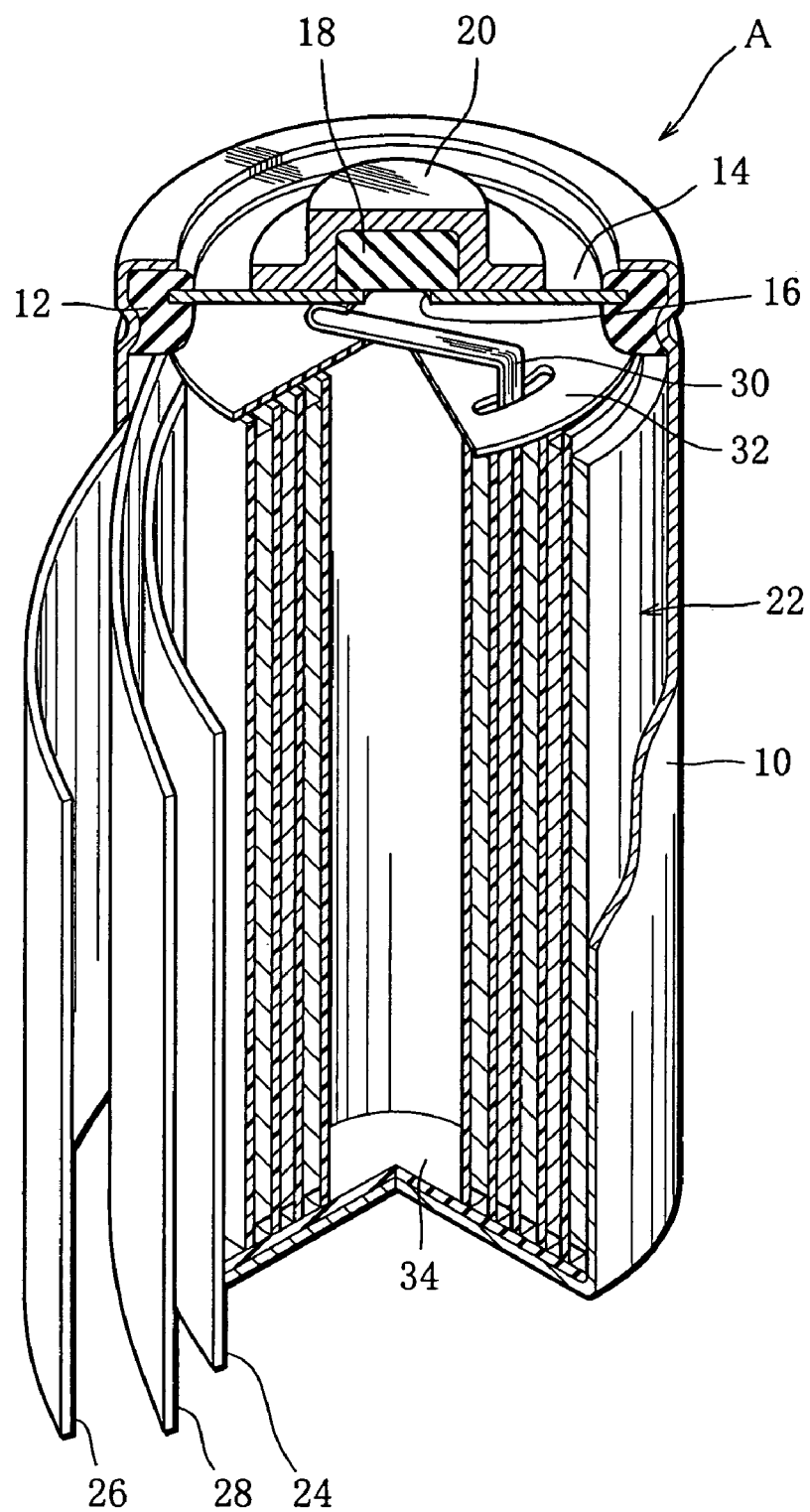
FIG. 1 is a perspective cutaway view of a cylindrical nickel-hydrogen rechargeable battery according to an embodiment of the invention.

Referring to the drawings attached, a cylindrical nickel-hydrogen rechargeable battery according to an embodiment of the invention (hereinafter referred to as "battery A") will be described in detail.

As shown in FIG. 1, the battery A comprises an outer can 10 formed in the shape of a bottomed cylinder open at the top. The outer can 10 has electrical conductivity, and functions as a negative-electrode terminal. An electrically-conductive cover plate 14 is placed in the opening of the outer can 10, with a ring-shaped insulating gasket 12 interposed therebetween. By crimping the rim of the outer can 10 with the insulating gasket 12 and the cover plate 14 placed in the opening of the outer can 10, the insulating gasket 12 and the cover plate 14 are fixed in the opening of the outer can 10.

The cover plate 14 has a gas release hole 16 in the center, and a valve body 18 of rubber is placed on the outer surface of the cover plate 14 so as to cover the gas release hole 16. Further, a hat-shaped positive-electrode terminal 20 is fixed on the outer surface of the cover plate 14 to cover the valve body 18. The positive-electrode terminal 20 presses the valve body 18 against the cover plate 14. Hence, the outer can 10 is normally closed air-tightly by means of the insulating gasket 12, the cover plate 14, and the valve body 18. When gas is produced inside the outer can 10 and the inner pressure in the outer can 10 increases, the valve body 18 is compressed, so that the gas is released from the outer can 10 through the gas release hole 16. The cover plate 14, the valve body 18, and the positive-electrode terminal 20 constitute a safety valve.

In the outer can 10 is held a columnar electrode group 22 with an alkaline electrolyte (not shown). The outermost circumferential part of the electrode group 22 is in direct contact with the circumferential wall of the outer can 10. The electrode group 22 consists of a positive electrode 24, a negative electrode 26, and a separator 28. The alkaline electrolyte can be, for example, an aqueous sodium hydroxide solution, an aqueous lithium hydroxide solution, an aqueous potassium hydroxide solution, or a mixture of two or more of these aqueous solutions.

Inside the outer can 10, a positive-electrode lead 30 is provided between an end of the electrode group 22 and the cover plate 14. An end of the positive-electrode lead 30 is connected to the positive electrode 24 while the other end is connected to the cover plate 14. Thus, the positive electrode 24 is electrically connected to the positive-electrode terminal 20 by means of the positive-electrode lead 30 and the cover plate 14. A circular insulating piece 32 is provided between the cover plate 14 and the electrode group 22, and the positive-electrode lead 30 extends through a slit formed in the insulating piece 32. A circular insulating piece 34 is further provided between the electrode group 22 and the bottom of the outer can 10.

Figure 2:
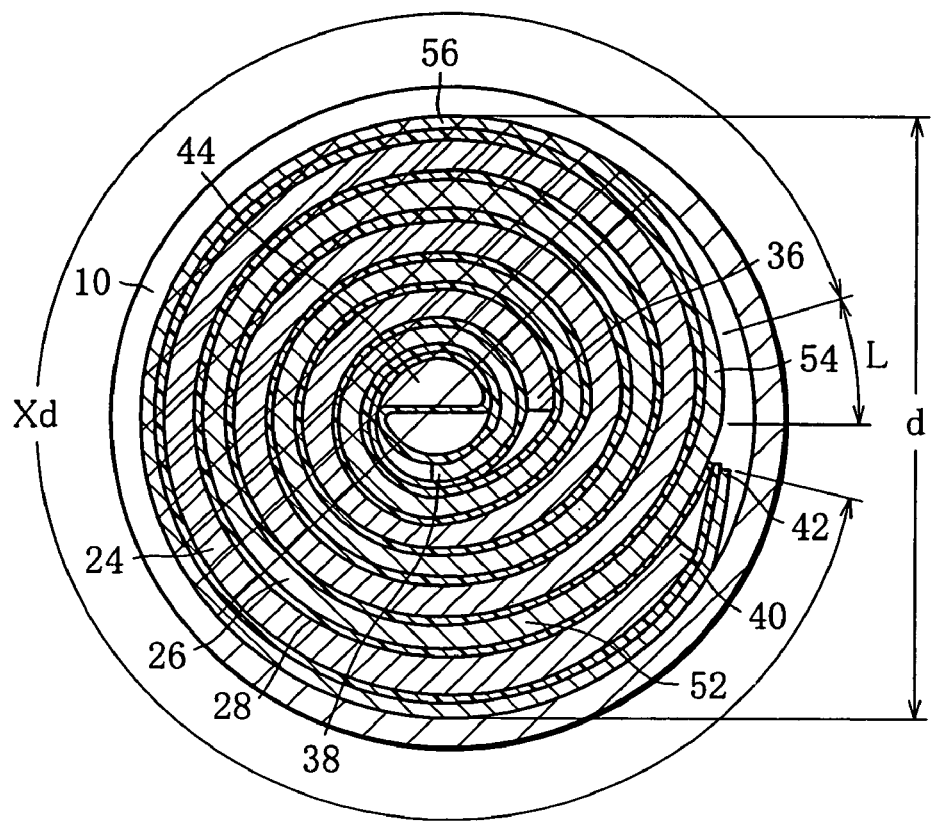
FIG. 2 is a transverse sectional view of the battery of FIG. 1.

Referring to FIG. 2, in the electrode group 22, the positive electrode 24 and the negative electrode 26 are alternately overlapped in the direction of diameter of the electrode group 22, with the separator 28 inserted therebetween.

Specifically, in order to form the group electrode 22, there are prepared a positive electrode 24, a negative electrode 26, and a separator 28 each formed in the shape of a strip. The positive electrode 24, the negative electrode 26, and the separator 28 are so laid that the negative electrode 26 is outside the positive electrode 24 with the separator 28 therebetween. Next, they are rolled up from one end, using a rolling core, so that the electrode group 22 is formed. An end (inner end) 36 of the positive electrode 24 and an end (inner end) 38 of the negative electrode 26 are placed to the center side of the electrode group 22, while the other ends (outer ends) 40, 42 of the positive and negative electrodes 24, 26 are placed to the circumference side of the electrode group 22. The negative electrode 26, which is longer than the positive electrode 24, begins inside the positive electrode inner end 36 and extends beyond the positive electrode outer end 40, describing a whirl, so that the positive electrode 24 is sandwiched from both sides through the separator 28 by the negative electrode 26 over the entire length of the positive electrode 24. The separator 28 does not extend outside the outermost circumferential part of the electrode group 22. In other words, the negative electrode 26 forms the outermost circumferential part of the electrode group 22. At the outermost circumferential part of the electrode group 22, the negative electrode is electrically connected to the outer can 10. At the outer end 42, the negative electrode 26 extends beyond the positive electrode outer end 40 in the circumferential direction of the electrode group 22 by a length long enough to cover the outer side of the positive electrode outer end 40 through the separator 28. In other words, the negative electrode outer end 42 is positioned near and past the positive electrode outer end 40 in the circumferential direction of the electrode group 22. After the electrode group is rolled up, the rolling core is drawn out. Hence, there is left a space 44 corresponding to the shape of the rolling core in the center of the electrode group 22.

The material for the separator 28 can be, for example, nonwoven fabric of polyamide fiber, nonwoven fabric of polyolefin fiber such as polyethylene or polypropylene with a hydrophilic functional group added.

Although not shown in the drawings, the positive electrode 24 includes a strip-shaped electrically-conductive positive-electrode core body, which supports a positive-electrode mixture. The positive-electrode core body can be made of a foamed nickel base material having a porous structure, for example. In the case of using a foamed nickel base material, the positive-electrode mixture is held in communicating holes in the foamed nickel base material.

The positive-electrode mixture comprises a positive-electrode active material, an additive, and a binder, for example. The positive-electrode active material is not limited to a particular one. It can be nickel hydroxide particles or nickel hydroxide particles into which cobalt, zinc, cadmium or the like is dissolved. The additive can be a conductant agent of a cobalt compound, and the binder can be for example a hydrophilic or hydrophobic polymer.

Figure 3:
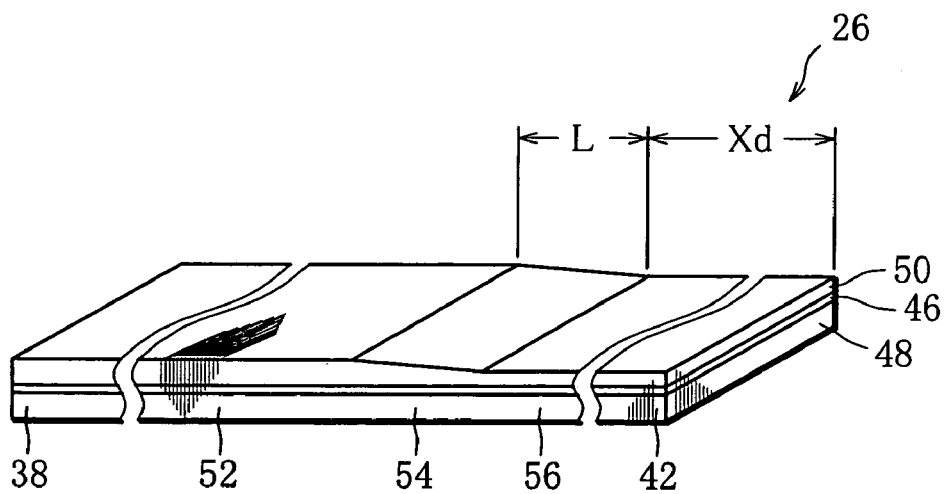
FIG. 3 is a perspective view showing a negative electrode used in the battery of FIG. 1 in a developed state.
Figure 4:
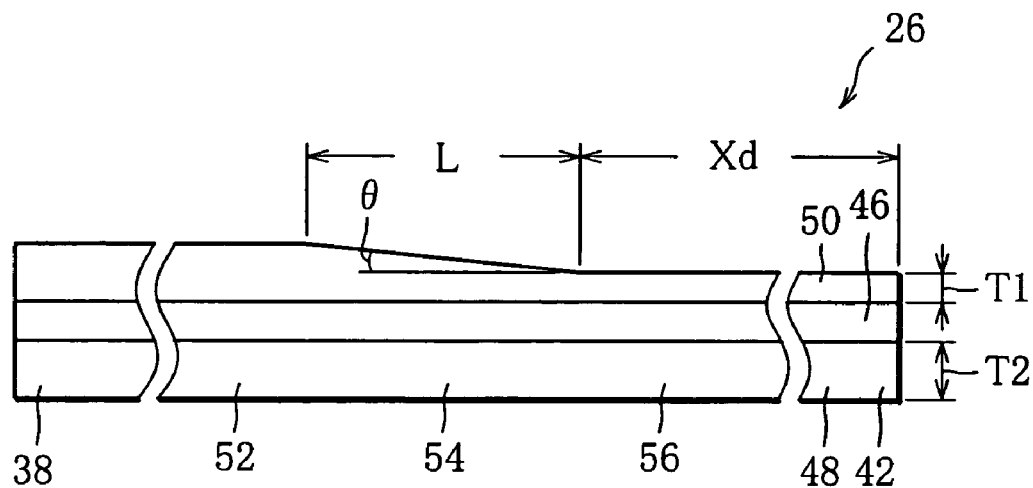
FIG. 4 is a side view of the negative electrode shown in FIG. 3.

The negative electrode 26, which is shown in a developed state in FIGS. 3 and 4, includes a strip-shaped electrically-conductive negative-electrode core body 46 which supports a negative-electrode mixture. The negative-electrode core body 46 is formed of a metal sheet having a plurality of through-holes across the thickness thereof. For example, punching metal, a sintered metal powder substrate, expanded metal, and a nickel net can be used for this metal sheet. Punching metal and a sintered metal powder substrate, which is made by shaping and then sintering metal powder, are particularly suitable for the negative-electrode core body 46. For simplicity of illustration, the negative-electrode core body 46 is omitted in FIGS. 1 and 2.

Since the battery A is a nickel-hydroxide rechargeable battery, the negative-electrode mixture comprises hydrogen-absorbing alloy particles capable of storing and releasing hydrogen and serving as a negative-electrode active material, and a binder. In this invention, for convenience sake, the hydrogen-absorbing alloy is regarded as an active material.

The hydrogen-absorbing alloy particles are ones that can store hydrogen electrochemically produced in the alkaline electrolyte during charging the battery A and can easily release the stored hydrogen during discharging. The hydrogen-absorbing alloy is not limited to a particular one, and can be for example an $AB_5$ type such as $LaNi_5$ or $MmNi_5$ (Mm represents misch metal). The binder can be for example a hydrophilic or hydrophobic polymer. Further, a conductant agent such as carbon black or Ni powder may be added as necessary. By using a cadmium compound in place of the hydrogen-absorbing alloy, the battery A can be formed as a nickel-cadmium rechargeable battery, but nickel-hydrogen rechargeable battery is more suitable for increasing the battery capacity.

Since the negative-electrode mixture is filled in the through-holes in the negative-electrode core body 46 and the negative-electrode core body 46 is formed in the shape of a sheet, the negative-electrode mixture is spread in layer over both sides of the negative-electrode core body 46, thereby forming active material layers (layers of the mixture) 48 and 50, as shown in FIGS. 3 and 4. In the following, that layer of the negative-electrode mixture which covers the inner side of the negative-electrode core body 46 and which is directed toward the central axis of the electrode group 22 will be referred to as "inner hydrogen-absorbing alloy layer 48" or "inner alloy layer 48", whereas a layer of the negative-electrode mixture which covers the outer side of the negative-electrode core body 46 and is directed toward the outside of the electrode group 22 will be referred to as "outer hydrogen-absorbing alloy layer 50" or "outer alloy layer 50".

In the negative electrode 26, the thickness T2 of the inner alloy layer 48 is almost constant from the negative electrode inner end 38 to the negative electrode outer end 42, whereas the outer alloy layer 50 has a thickness varying between the negative electrode inner end 38 and the negative electrode outer end 42. As to the thickness of the outer alloy layer 50, the negative electrode 26 is divided into three sections in the lengthwise direction of the negative-electrode core body 46. Specifically, it is divided into a main part 52, a boundary part 54, and a thin part 46 in this order in the direction from the negative electrode inner end 38 to the negative electrode outer end 42 (see FIGS. 3 to 6).

When rolled up, the main part 52 of the negative electrode 26 is positioned on the inside of the electrode group 22, and the positive electrode 24 is disposed through the separator 28 on both sides of the main part 52 of the negative electrode 26. In the main part 52, the thickness of the outer alloy layer 50 is almost the same as the thickness T2 of the inner alloy layer 48.

The boundary part 54 of the negative electrode 26 is formed between the main part 52 and the thin part 56 of the negative electrode 26 and has a thickness varying in the lengthwise direction of the negative-electrode core body 46. When the negative electrode 26 is rolled up together with the positive electrode 24 and the separator 28 into the electrode group 22, the boundary part 54 is positioned at a position different from that of the positive electrode outer end 40 in the circumferential direction of the electrode group 22 (see FIGS. 5 and 6). In the present embodiment, the boundary part 54 has a length L, and the thickness of the outer alloy layer 50 in the boundary part 54 decreases from the main part 52 side toward the thin part 56 gradually at an almost constant rate of change from the thickness T2 to the thickness T1.

Assuming that the negative electrode 26 is spread on a flat reference plane and θ is the angle of inclination of the surface of the outer alloy layer 50 in the boundary part 54 to the flat reference plane or to the surface of the outer alloy layer 50 in the thin part 56 (see FIG. 4), the angle θ of inclination is desirably in the range of 0°<θ<10°. By making the angle θ of inclination smaller than 10° to thereby make the change in thickness in the boundary part 54 gentle, production of cracks and/or splits in the boundary part 54 is prevented that would be caused when the negative electrode 26 is rolled up together with the positive electrode 24 and the separator 28.

The thin part 56 forms the outermost circumferential part of the electrode group 22, covers the outer side of the positive electrode outer end 40 through the separator 28, and is in close contact with the circumferential wall of the outer can 10. The thickness T1 of the outer alloy layer 50 in the thin part 56 is constant in the lengthwise direction of the negative-electrode core body 46, and smaller than the thickness of the outer alloy layer 50 in the main part 52 or the thickness T2 of the inner alloy layer 48. In the thin part 56, therefore, the inner alloy layer 48 is thicker than the outer alloy layer 50.

Desirably, the length Xd of the thin part 56 (see FIGS. 4 to 6) is in the range of 2.5 to 3.8 times the inside diameter d of the outer can 10. As mentioned above, the battery A is arranged that the negative electrode outer end 42 (the outer end of the thin part 56) is located immediately outside the positive electrode outer end 40. Under this restriction, by determining the length Xd of the thin part 56 to be in the above-mentioned desirable range so as to place the boundary part 54 in an appropriate circumferential position relative to the positive electrode outer end 40, the length over which the positive electrode extends on both sides of the thin part can be made short, and the length over which the positive electrode does not extend outside the main part can also be made short. This reduces the risk of the amount of the active material being too small or too large due to the aforesaid basic arrangement, making it possible to increase and improve the capacity and the cycle characteristic of the battery A.

In the negative electrode 26, the thin part 56 is thinner than the main part 52, and the amount of hydrogen-absorbing alloy particles contained in unit volume of the inner and outer alloy layers 48, 50 is smaller in the thin part 56 than in the main part 52, whereby the thin part 56 is made more flexible than the main part 52.

In the negative electrode 26, desirably the amount of hydrogen-absorbing alloy contained in unit area of the thin part 56 is in the range of 40% to 75% of the amount of hydrogen-absorbing alloy contained in unit area of the main part 52. By arranging that the amount of hydrogen-absorbing alloy contained in the thin part 56 is in this desirable range, it is made possible to ensure an amount of hydrogen-absorbing alloy in the thin part large enough to contribute to battery reaction with the positive electrode, and large enough to contribute to reaction for reducing oxygen gas flowing to between the electrode group and the outer can, while decreasing the thickness of the thin part.

The battery A can be fabricated by using ordinary methods. An example of fabrication methods of the negative electrode 26 will be described below.

First, there are prepared for example punching metal for the negative-electrode core body 46, and a negative-electrode mixture paste. Next, the paste is applied on the punching metal, thin on a part forming the thin part 56 of the negative electrode and thick on a part forming the main part 52, and dried. Then the punching metal with the dried negative-electrode mixture thereon is passed through between a pair of mill rolls to compress it from both sides across the thickness thereof. In this rolling, the pressing force exerted by rolls is variably controlled to be larger for the part forming the main part 52 than for the part forming the thin part 56, so that the amount of hydrogen-absorbing alloy contained in unit value of the inner and outer alloy layers 48, 50 will be smaller in the thin part 56 than in the main part 52 in the negative electrode 26 formed. Then, the punching metal rolled is cut to a predetermined size, so that the strip-shaped negative electrode 26 is obtained. The angle θ of inclination of the boundary part 54 can be adjusted by controlling the thickness of the paste applied, the pressing force, etc.

In the battery A having the structure described above, it is possible to increase the volume of the positive electrode 24 in a manner corresponding to the volume of the negative electrode 26 decreased by the provision of the thin part 56 that is thinner than the main part 52. The increase in volume of the positive electrode 24 brings increase in the amount of the positive-electrode active material contained in the battery A, resulting in increase in the capacity of the battery A.

In the battery A, the amount of hydrogen-absorbing alloy contained in unit volume of the inner and outer alloy layers 48, 50 is made smaller in the thin part 56 than in the main part 52, and the boundary part 54 and the positive electrode outer end 40 are positioned at different positions in the circumferential direction of the electrode group 22, whereby production of cracks and/or splits in the thin part 56 is prevented, thus preventing increase in internal resistance, heating due to the increase in internal resistance, and production of a short circuit.

At the outermost circumferential part of the electrode group 22 obtained by spirally winding the positive electrode 24, the negative electrode 26, and the separator 28 together, the thin part 56 of the negative electrode 26 and the separator 28 extend beyond the outer end 40 of the positive electrode 24 in the circumferential direction of the electrode group 22. At the positive electrode outer end 40, therefore, there is produced a step difference for the thin part 56. The larger the thickness of the positive electrode 24 is made to increase the capacity of the battery A, the larger the step difference becomes. To be noted, the diameter of the electrode group 22 is largest in the direction connecting the positive electrode outer end 40 and the central axis of the electrode group 22 although the cross section of the electrode group 22 is nearly a circle.

When the electrode group 22 is inserted into the outer can 10, the electrode group 22 is compressed most in this largest-diameter direction by the rim or the circumferential wall of the outer can 10. During the insertion of the electrode group 22, therefore, the thin part 56 is compressed and bent at the step difference formed by the positive electrode outer end 40. The battery A is arranged that the amount of hydrogen-absorbing alloy contained in unit volume of the inner and outer alloy layers 48, 50 is smaller in the thin part 56 than in the main part 52, so that the thin part is made more flexible than the main part 52. Hence, even if the positive electrode 24 is made thick to increase the capacity of the battery A, the thin part 56 is bent without producing cracks or splits when the electrode group 22 is inserted.

Even when the thin part 56 is more flexible than the main part 52, however, if the positive electrode outer end 40 and the boundary part 54 overlap each other as viewed in the direction of diameter of the electrode group 22, the presence of the boundary part 54 acts to increase the step difference for the thin part 56 at the positive electrode outer end 40. Specifically, if the boundary part 54 is positioned at substantially the same circumferential position as that of the positive electrode outer end 40, the step difference for the thin part 56 increases by an amount by which the boundary part 54 is thinner than the main part 52. In this case, the thin part 56 is largely bent at the step difference, so that cracks and/or splits may be produced in the thin part 56. In this respect, the battery A is arranged that the boundary part 54 and the positive electrode outer end 40 are positioned at different positions in the circumferential direction of the electrode group 22, so that they do not overlap each other as viewed in such direction, thereby surely preventing production of cracks and/or splits in the thin part 56 that would be caused when the electrode group 22 is inserted.

The battery A, which is capable of surely preventing the production of cracks and/or splits in the thin part 56 this way, can prevent the increase in internal resistance of the battery that would be caused when the electrical resistance of the negative electrode 26 increases due to the presence of cracks and/or splits, and can prevent part having a crack or a split from piercing through the separator 28 and coming in contact with the positive electrode 24 to produce a short circuit.

According to the battery A arranged that the amount of hydrogen-absorbing alloy contained in unit area of the thin part 56 is in the range of 40% to 75% of the amount of hydrogen-absorbing alloy contained in unit area of the main part 52, it is possible to achieve both high capacity and a good cycle characteristic.

Specifically, as stated above, the capacity of the battery A can be increased by decreasing the thickness of the thin part 56. On the other hand, the thin part 56 not only contributes to battery reaction with the positive electrode 24 disposed inside the thin part, but also has a function of reducing oxygen gas flowing to between the electrode group 22 and the outer can 10 into water, to thereby prevent increase in the inner pressure of the battery. In this regard, the battery A is arranged that the amount of hydrogen-absorbing alloy contained in unit area of the thin part 56 is in the range of 40% to 75% of the amount of hydrogen-absorbing alloy contained in unit area of the main part 52, to thereby ensure an amount of hydrogen-absorbing alloy large enough to contribute to battery reaction with the positive electrode and to reaction for reducing oxygen gas flowing to between the electrode group and the circumferential wall of the outer can, while decreasing the thickness of the thin part 56, so as to achieve the increase in the capacity and prevent deterioration in the cycle characteristic due to decrease in the alkaline electrolyte caused by increase in the inner pressure.

In the battery A, the thickness of the inner alloy layer 48, facing the positive electrode 28 with the separator therebetween and contributing to both the battery reaction with the positive electrode and the reaction for reducing oxygen gas, is made larger than the thickness of the outer alloy layer 50, which is separated from the inner alloy layer 48 by the negative-electrode core body 46, brought in contact with the circumferential wall of the outer can 10, and contributes solely to the reaction for reducing oxide gas flowing to between the electrode group 22 and circumferential wall of the outer can 10. With the just-mentioned arrangement, it is possible to achieve both high capacity and a good cycle characteristic efficiently.

The battery A is further arranged that the length Xd of the thin part 56 is in the range of 2.5 to 3.8 times the inside diameter d of the outer can 10, whereby both high capacity and a good cycle characteristic of the battery A can more reliably be achieved.

Figure 5:
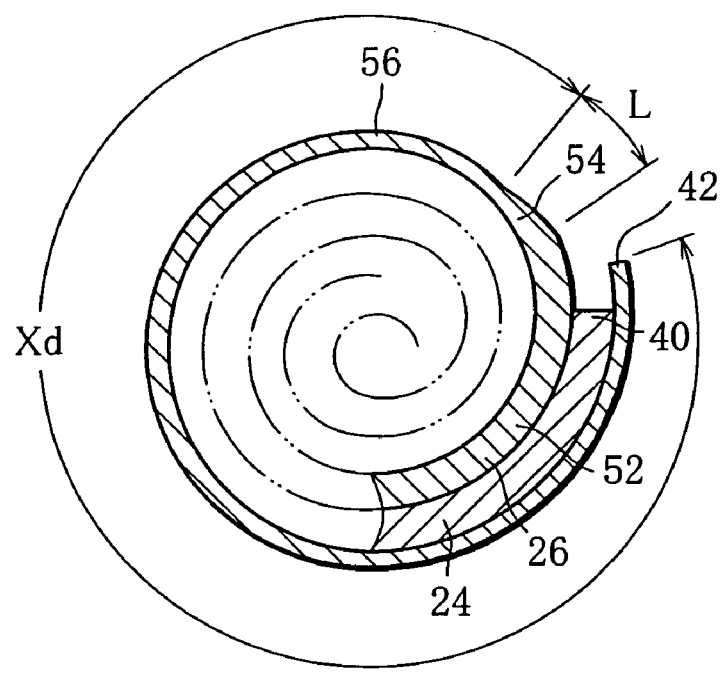
FIG. 5 is a schematic diagram of an electrode group for explaining a circumferential positional relationship between a positive electrode outer end and a boundary part of a negative electrode.
Figure 6:
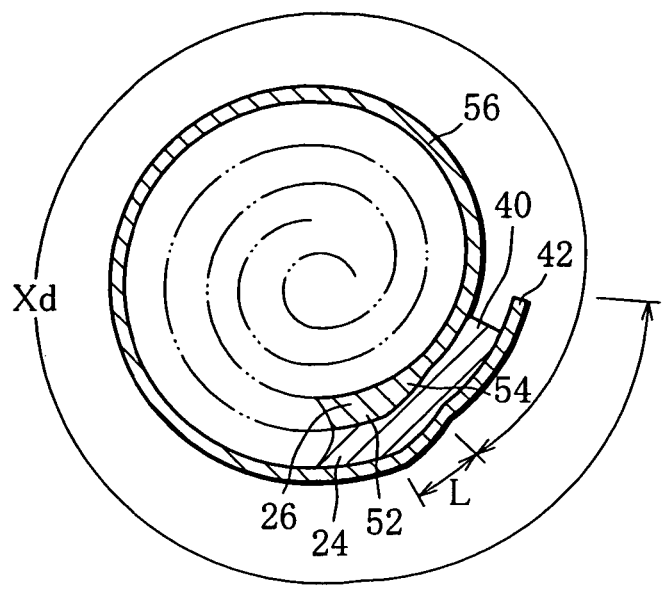
FIG. 6 is a schematic diagram of an electrode group for explaining circumferential positional relationship between a positive electrode outer end and a boundary part of a negative electrode.

Specifically, as mentioned above, the battery A is arranged that the positive electrode outer end 40 and the boundary part 54 of the negative electrode 26 do not overlap each other as viewed in the direction of diameter of the electrode group 22, and thus the thin part 56 or the main part 52 is positioned inside the positive electrode outer end 40. Therefore, the main portion 52 can sometimes have a part thereof for which the positive electrode 24 does not extend outside the main part 52 as schematically shown in FIG. 5, and the thin part 56 can sometimes have a part thereof for which the positive electrode 24 extends on both sides of the thin part 56 as schematically shown in FIG. 6. In these cases, there is a risk that the amount of hydrogen-absorbing alloy contributing to the battery reaction with the positive electrode is too large or too small, making it difficult to simultaneously achieve a high capacity and a good cycle characteristic of the battery. In the battery A, the length Xd of the thin part 56 is so determined as to be in the range of 2.5 to 3.8 times the inside diameter d of the outer can 10, to shorten the length over which the positive electrode extends on both sides of the thin part and the length over which the positive electrode does not extend outside the main part, thereby reducing the risk of the amount of hydrogen-absorbing alloy being too small or too large, so that both high capacity and a good cycle characteristic are achieved more reliably. Meanwhile, the separator 28 is omitted in FIGS. 5 and 6.

In the battery A, the angle θ of inclination of the boundary part 54 to the longitudinal direction of the negative electrode 26 is in the range of 0°<θ<10°. This helps prevent production of a short circuit and increase in internal resistance more reliably.

Specifically, a locally concentrated stress can easily be produced when the boundary part 54 whose thickness varies is rolled up. In other words, the boundary part 54 varying in thickness is liable to experience shortage of strength, as compared to the main part 52 and the thin part 56 that are constant in thickness. In view of this, it is arranged that the angle θ of inclination is in the range of 0°<θ<10° to make the change in thickness gentle, thereby preventing concentration of stress in the boundary part 54, shortage of strength in the boundary part 54, and production of cracks and/or splits in the boundary part 54 that would be caused when the electrode group is rolled up. According to the battery A, therefore, not only in the thin part 56 but also in the boundary part 54, the increase in the internal resistance due to cracks and/or splits is prevented, and a short circuit is prevented that is produced by a part having a crack and/or a split piercing through the separator 28 and coming in contact with the positive electrode 24.

The invention is not limited to the above-described embodiment, and various modifications thereto can be made.

For example, the thicknesses of both the inner and outer alloy layers 48, 50 may be made smaller in the thin part 56 than in the main part 42, instead of making only the outer alloy layer 50 smaller.

As with the positive electrode 24, a material having a porous structure such as a foamed nickel material may be used for the negative-electrode core body 46, instead of the sheet-shaped material having through-holes. In this case, the hydrogen-absorbing alloy layer is supported by the negative-electrode core body in a state that the frame of the foamed nickel material spreads throughout the hydrogen-absorbing alloy layer in the form of a mesh-like network.

In the above-described embodiment, in order to prevent production of cracks and the like in the boundary part 54, it is arranged that the angle θ of inclination is in the predetermined range. Instead or in combination, a negative-electrode core body may be used that has the boundary part 54 thereof reinforced by making the mass per unit area larger in the boundary part 54 than in the main part 52 and the thin part 56.

Figure 7:
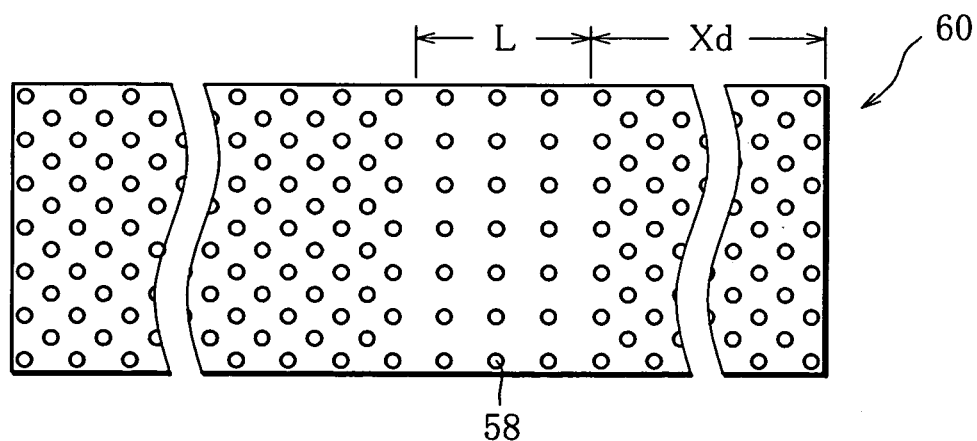
FIG. 7 is a plan view of a negative-electrode core body used in a cylindrical nickel-hydrogen rechargeable battery according to another embodiment of the invention.
Figure 8:
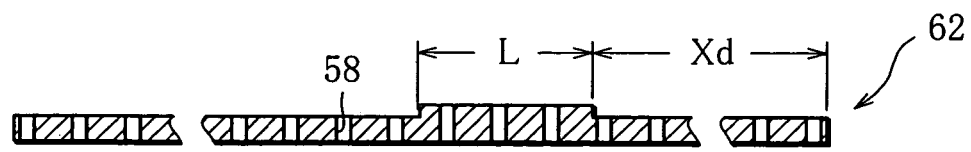
FIG. 8 is a cross-sectional view of a negative-electrode core body used in a cylindrical nickel-hydrogen rechargeable battery according to still another embodiment of the invention.

More specifically, a negative-electrode core body 60 may be used in which, as shown in FIG. 7, through-holes 58 are made smaller in number in the boundary part 54 than in the main part 52 and the thin part 56 so as to decrease the opening area of the through-holes 58, or a negative-electrode core body 62 may be used in which, as shown in FIG. 8, the thickness is made larger in the boundary part 54 than in the main part 52 and the thin part 56. Alternatively, a negative-electrode core body may be used in which the diameter of the through-holes is made smaller in the boundary part 54 than in the main part 52 and the thin part 56.

EXAMPLES

Examples 1 to 5, Comparative Examples 1 and 2

1. Assembly of Batteries

For each of Examples 1 to 5 and Comparative Example 1, there were assembled 100 cylindrical nickel-hydrogen rechargeable batteries of AA size having a structure shown in FIGS. 1 to 4.

For Comparative Example 2, there were assembled 100 cylindrical nickel-hydrogen rechargeable batteries which were the same in structure as Example 1 except that the positive electrode outer end 40 and the boundary part 54 of the negative electrode 26 were positioned at the same circumferential position in the electrode group 22.

For each of Examples 1 to 5 and Comparative Examples 1 and 2, Table 1 shows the thicknesses of the main part 42 and the thin part 56 of the negative electrode 26, and shows the amount of hydrogen-absorbing alloy contained in unit volume of the inner and outer alloy layers 48 and 50 in the thin part 56 of the negative electrode 26. In Table 1, the amount is represented by a relative value to the amount of hydrogen-absorbing alloy contained in unit volume of the inner and outer alloy layers 48 and 50 in the main part 52 of the negative electrode 26, which is assumed to be equal to 100.

2. Battery Characteristic Evaluation Test

For each of Examples 1 to 5 and Comparative Examples 1 and 2, out of the 100 batteries, how many batteries had splits produced in the thin part was counted, after the electrode group was rolled up. For each of the assembled cylindrical nickel-hydrogen rechargeable battery, the internal resistance (mΩ) was measured with an AC (1 kHZ), and a short circuit was checked. The results are shown in Table 1, in which the internal resistance is the average in the group of 100 batteries from which batteries producing a short circuit were excluded.

TABLE 1

|  | Nagative Electrode | | Amount of hydrogen-absorbing alloy contained in unit volume of inner and outer alloy layers in thin part (Amount in main part is considered 100) | Battery Evaluation | | |
|---|---|---|---|---|---|---|
|  | Thickness of main part (mm) | Thickness of thin part (mm) |  | Number of batteries having split in thin part | Internal resistance (mΩ) | Number of batteries producing short circuit |
| Example 1 | 0.42 | 0.28 | 89 | 0 | 17 | 0 |
| Example 2 | 0.42 | 0.26 | 97 | 2 | 22 | 0 |
| Example 3 | 0.42 | 0.27 | 93 | 1 | 18 | 0 |
| Example 4 | 0.42 | 0.29 | 84 | 1 | 20 | 0 |
| Example 5 | 0.42 | 0.30 | 82 | 0 | 18 | 0 |

TABLE 1-continued

| | Negative Electrode | | | Battery Evaluation | | |
|---|---|---|---|---|---|---|
| | Thickness of main part (mm) | Thickness of thin part (mm) | Amount of hydrogen-absorbing alloy contained in unit volume of inner and outer alloy layers in thin part (Amount in main part is considered 100) | Number of batteries having split in thin part | Internal resistance (mΩ) | Number of batteries producing short circuit |
| Comparative Example 1 | 0.42 | 0.25 | 100 | 8 | 27 | 4 |
| Comparative Example 2 | 0.42 | 0.28 | 89 | 23 | 32 | 2 |

From Table 1, the followings are clear:

In respect of the number of batteries having split in the thin part, the internal resistance, and the number of batteries producing a short circuit, Examples 1 to 5, in which the thickness is smaller in the thin part 56 than in the main part 52 and in which the amount of hydrogen-absorbing alloy contained in unit volume of the inner and outer alloy layers 48, 50 is smaller in the thin part 56 than in the main part 52, are better than Comparative Example 1 in which the amount of hydrogen-absorbing alloy contained in unit volume of the inner and outer alloy layers 48, 50 in the thin part 56 and that in the main part 52 are the same.

In respect of the number of batteries having split in the thin part, the internal resistance, and the number of batteries producing a short circuit, Example 1 is better than Comparative Example 2 in which the positive electrode outer end 40 and the boundary part 54 of the negative electrode 26 are positioned at the same circumferential position in the electrode group 22. This indicates that it is preferable to position the boundary part 54 of the negative electrode 26 and the positive electrode outer end 40 at different circumferential positions in the electrode group.

What is claimed is:

1. A cylindrical alkaline storage battery, comprising:
an electrically-conductive cylindrical outer can; and
an electrode group accommodated in the outer can together with an alkaline electrolyte, said electrode group being formed by rolling up together a positive electrode, a negative electrode placed outside the positive electrode and including a strip-shaped negative-electrode core body and an active material layer supported by the negative-electrode core body, and a separator inserted between the positive electrode and the negative electrode, an outermost circumferential part of the electrode group being formed of the negative electrode and in contact with a circumferential wall of the outer can, said negative electrode extending beyond an outer end of the positive electrode in a circumferential direction of the electrode group, wherein
said negative electrode comprises:
a main part forming an inside part of the electrode group,
a thin part forming the outermost circumferential part of the electrode group, the thin part being smaller in thickness of the active material layer and smaller in amount of the active material contained in unit volume of the active material layer than the main part, and
a boundary part formed between the main part and the thin part in which the thickness of the active material layer changes in a lengthwise direction of the negative-electrode core body; and
the outer end of the positive electrode and the boundary part of the negative electrode are positioned at different positions in the circumferential direction of the electrode group,
wherein the negative-electrode core body is made of punching metal, wherein the active material layer of the negative electrode is supported on outer and inner sides of the negative-electrode core body, and wherein in the thin part of the negative electrode, the active material layer supported on the inner side of the negative-electrode core body is thicker than the active material layer supported on the outer side of the negative-electrode core body.

2. The cylindrical alkaline storage battery according to claim 1, wherein the amount of the active material contained in unit area of the active material layer in the thin part of the negative electrode is in the range of 40% to 75% of the amount of the active material contained in unit area of the active material layer in the main part of the negative electrode.

3. The cylindrical alkaline storage battery according to claim 1, wherein the thin part of the negative electrode has a length thereof which is in the range of 2.5 to 3.8 times the inside diameter of the outer can.

4. The cylindrical alkaline storage battery according to claim 1, wherein an angle of inclination of the active material layer in the boundary part of the negative electrode is greater than 0 degree and less than 10 degrees.

5. A cylindrical alkaline storage battery, comprising:
an electrically-conductive cylindrical outer can; and
an electrode group accommodated in the outer can together with an alkaline electrolyte, said electrode group being formed by rolling up together a positive electrode, a negative electrode placed outside the positive electrode and including a strip-shaped negative-electrode core body and an active material layer supported by the negative-electrode core body, and a separator inserted between the positive electrode and the negative electrode, an outermost circumferential part of the electrode group being formed of the negative electrode and in contact with a circumferential wall of the outer can, said negative electrode extending beyond an outer end of the positive electrode in a circumferential direction of the electrode group, wherein
said negative electrode comprises:
a main part forming an inside part of the electrode group, a thin part forming the outermost circumferential part of the electrode group, the thin part being smaller in thickness of the active material layer and smaller in amount of the active material contained in unit volume of the active material layer than the main part, and a boundary part formed between the main part and the thin part in which the thickness of the active material layer changes in a lengthwise direction of the negative-electrode core body; and the outer end of the positive electrode and the boundary part of the negative electrode are positioned at different positions in the circumferential direction of the electrode group, wherein a mass per unit area of the negative-electrode core body is larger in the boundary part of the negative electrode than in the main part of the negative electrode.

6. A cylindrical alkaline storage battery according to claim 5, wherein the negative-electrode core body is made of punching metal, wherein the active material layer of the negative electrode is supported on outer and inner sides of the negative-electrode core body, and wherein in the thin part of the negative electrode, the active material layer supported on the inner side of the negative-electrode core body is thicker than the active material layer supported on the outer side of the negative-electrode core body.

* * * * *